United States Patent
Hundemer

(10) Patent No.: US 10,535,986 B2
(45) Date of Patent: Jan. 14, 2020

(54) TETHERED UNMANNED AERIAL VEHICLE SYSTEM

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 431 days.

(21) Appl. No.: 15/415,777

(22) Filed: Jan. 25, 2017

(65) Prior Publication Data

US 2018/0212413 A1 Jul. 26, 2018

(51) Int. Cl.
*H02G 11/02* (2006.01)
*B64C 39/02* (2006.01)
(Continued)

(52) U.S. Cl.
CPC .............. *H02G 11/02* (2013.01); *B60P 3/11* (2013.01); *B60P 7/06* (2013.01); *B64C 39/022* (2013.01);
(Continued)

(58) Field of Classification Search
CPC ..... H02G 11/02; B64C 39/022; B64C 39/024; B64C 2201/148; B60P 7/06; B60P 3/11;
(Continued)

(56) References Cited

U.S. PATENT DOCUMENTS 10,099,782 B2 * 10/2018 Hundemer ............ B64C 39/022
10,384,778 B2 * 8/2019 Hundemer ............ B64C 39/022
(Continued)

FOREIGN PATENT DOCUMENTS

WO    WO 2007/141795 A1    12/2007
WO    WO 2010/009434 A2    1/2010

OTHER PUBLICATIONS

International Search Report issued in co-pending International Patent Application No. PCT/US2017/067945, Korean Intellectual Property Office, dated Mar. 22, 2018, 5 pages.
(Continued)

*Primary Examiner* — Khoi H Tran
*Assistant Examiner* — Rodney P King
(74) *Attorney, Agent, or Firm* — McDonnell Boehnen Hulbert & Berghoff LLP

(57) ABSTRACT

Example dynamically adjustable tether systems are described herein. An example tether system for use with an unmanned aerial vehicle (UAV) may include a base and a vertically-oriented elongate structure having an adjustable height. For instance, the elongate structure may include a lower end, and an upper end. The elongate structure may also couple to the base proximate the lower end. The system may further include a tether that extends from a first coupling-point positioned proximate the upper end of the elongate structure to a second coupling-point positioned on the UAV and a computing system configured for performing a set of acts, such as detecting a change in height of the elongate structure, and causing the tether to be reconfigured within the tether system based on the detected change in height of the elongate structure.

20 Claims, 3 Drawing Sheets

(51) Int. Cl.
*B60P 7/06* (2006.01)
*B60P 3/11* (2006.01)
*E04H 12/18* (2006.01)
*B65H 75/42* (2006.01)
*B65H 75/44* (2006.01)

(52) U.S. Cl.
CPC ......... *B64C 39/024* (2013.01); *B65H 75/425* (2013.01); *B65H 75/4484* (2013.01); *B65H 75/4486* (2013.01); *E04H 12/182* (2013.01); *B64C 2201/148* (2013.01); *B65H 2701/39* (2013.01)

(58) Field of Classification Search
CPC .............. B65H 2701/39; B65H 75/425; B65H 75/4484; B65H 75/4486; E04H 12/182
USPC .......................................................... 701/36
See application file for complete search history.

(56) References Cited

U.S. PATENT DOCUMENTS

| | | | |
|---|---|---|---|
| 2012/0112008 A1 | 5/2012 | Holifield et al. | |
| 2014/0263852 A1 | 9/2014 | Walker et al. | |
| 2016/0183461 A1* | 6/2016 | Neudorf | A01D 41/14 56/158 |
| 2016/0200437 A1* | 7/2016 | Ryan | B64C 39/022 244/99.2 |
| 2017/0190419 A1* | 7/2017 | Hundemer | B64C 39/022 |
| 2019/0002102 A1* | 1/2019 | Hundemer | B64C 39/022 |

OTHER PUBLICATIONS

Written Opinion issued in co-pending International Patent Application No. PCT/US2017/067945, Korean Intellectual Property Office, dated Mar. 22, 2018, 11 pages.

* cited by examiner

US 10,535,986 B2

TETHERED UNMANNED AERIAL VEHICLE SYSTEM

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example tether system for use with an unmanned aerial vehicle (UAV) is disclosed. The system includes: a base; a vertically-oriented elongate structure having an adjustable height, wherein the elongate structure comprises a lower end, and an upper end, wherein the base is coupled to the elongate structure proximate the lower end; a first coupling-point positioned proximate the upper end of the elongate structure; a tether that extends from the first coupling-point to a second coupling-point of the UAV; and a computing system configured for performing a set of acts comprising: detecting a change in height of the elongate structure; and based on the detected change in height of the elongate structure, causing the tether to be reconfigured within the tether system.

In another aspect, an example non-transitory computer-readable medium for use with a tether system is disclosed. The tether system includes: a base; a vertically-oriented elongate structure having an adjustable height, wherein the elongate structure comprises a lower end, and an upper end, wherein the base is coupled to the elongate structure proximate the lower end; a first coupling-point positioned proximate the upper end of the elongate structure; a tether that extends from the first coupling-point to a second coupling-point of a UAV. The non-transitory computer-readable medium has stored thereon program instructions that when executed cause performance of a set of acts comprising: detecting a change in height of the elongate structure; and based on the detected change in height of the elongate structure, causing the tether to be reconfigured within the tether system.

In a further aspect, an example method for use with a tether system is disclosed. The system includes: a base; a vertically-oriented elongate structure having an adjustable height, wherein the elongate structure comprises a lower end, and an upper end, wherein the base is coupled to the elongate structure proximate the lower end; a first coupling-point positioned proximate the upper end of the elongate structure; and a tether that extends from the first coupling-point to a second coupling-point of a UAV. The method includes: detecting a change in height of the elongate structure; and based on the detected change in height of the elongate structure, causing the tether to be reconfigured within the tether system.

DETAILED DESCRIPTION

I. Overview

Figure 1:
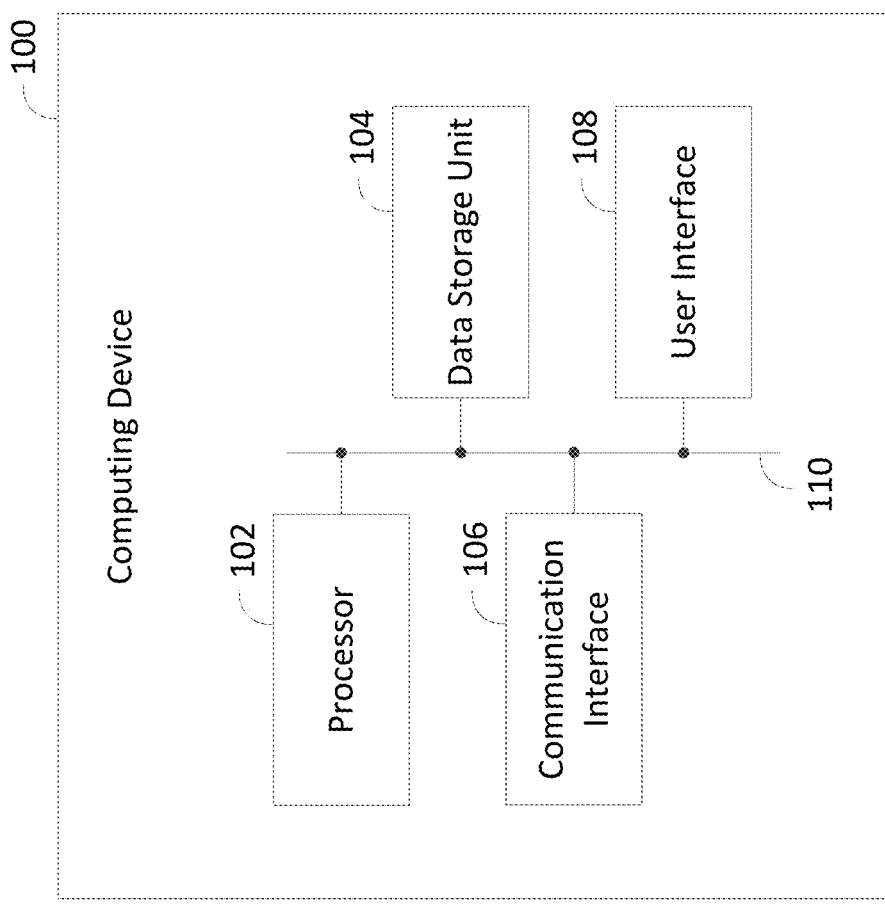
FIG. 1 is a simplified block-diagram of an example computing device.

Advancements in technology and computing have contributed to a recent increase in the development and overall use of UAVs. A UAV is an aircraft that can operate without an on-board human operator. Sometimes referred to as a "drone" or an "unmanned aerial system," a UAV can take various forms, such as a helicopter, quadcopter, fixed-wing aircraft, blimp, or glider, and can be used for various applications, such as capturing an image or video of an area from an aerial perspective.

A UAV can operate in one or more modes, such as a remote-control mode, an autonomous mode, or a semi-autonomous mode. While the UAV is operating in a remote-control mode, a remotely-located operator can operate the UAV. While the UAV is operating in an autonomous mode, a computing system onboard the UAV can operate the UAV. Finally, while the UAV is operating in a semi-autonomous mode, a remotely-located operator can cause the UAV to perform some operations, and a computing system onboard the UAV can cause the UAV to perform other operations. For instance, the operator can instruct the UAV to navigate to a particular location, and the computing system can cause the UAV to autonomously navigate to that location.

As discussed above, a UAV can fly without an onboard human operator. In some instances though, a UAV can malfunction and lose the ability to fly properly. As a result, the UAV can fall to the ground and crash, which can potentially injure a person or damage property. Disclosed herein are systems that can help to avoid such injuries and damage.

In one example, a tether system can have a base with a vertically-oriented elongate structure that positions a portion of a tether connected to a UAV at a height that can limit a position of the tethered UAV. Within the system, the tether can connect to a UAV from the top of the elongate structure. As a result, the tether can limit the distance that the UAV can fly away from the top of the elongate structure. Thus, the tether may constrain the UAV to a region centered at the top of the elongate structure and extending radially outward by an extent defined by the tether.

In some examples, the elongate structure in a tether system may have an adjustable height. For instance, the elongate structure may extend higher or lower depending on a desired altitude of operation for the UAV. Similarly, the elongate structure may also collapse into a foldable form during transportation of the base. In some instances, the tether system may automatically reconfigure the tether based on the current height of the elongate structure. For example, a tether system may include a computing system configured to detect a change in the height of the elongate structure and cause the tether system to reconfigure the tether based on the detected change in the elongate structure's height.

An example tether system may reconfigure the tether using various techniques. For example, a tether system may include a spooling mechanism coupled to the base or another component of the tether system (e.g., onto or inside the elongate structure). The spooling mechanism may spool or unspool a portion of the tether depending on a desired length of the tether. As an example illustration, the computing system may detect an increase in the height of the elongate structure and cause the spooling mechanism of the tether system to unspool a portion of the tether in response to detecting the increase. Similarly, the computing system may also detect a decrease in the height of the elongate structure and cause the spooling mechanism to spool a portion of the tether as a result.

In some example implementations, a computing system of a tether system may automatically configure the tether such that a portion of the tether extending from the top of the elongate structure to the UAV can have a length that is less than the height of the elongate structure. For instance, the computing system may use sensor data from a sensor system of the tether system to detect that the portion of the tether extending from the top of the elongate structure to the UAV has a length that is greater than the current height of the elongate structure. As a result, the computing system may cause the tether system to reconfigure the tether such that the portion of the tether extending from the top of the elongate structure is less than the height of the elongate structure. With this arrangement, even if the UAV malfunctions and loses the ability to fly property, rather than crashing into the ground, the combination of the elongate structure and tether can cause the UAV to swing like a pendulum from atop the elongate structure, and potentially miss hitting people or objects.

As indicated above, a computing system of an example tether system may cause the tether system to reconfigure the system in response to detecting a change in the height of the elongate structure. The computing system may detect the change in the height of the elongate structure using various techniques within examples. For instance, a tether system may include a sensor system that may provide sensor data to a computing system that indicates when the height of the elongate structure is changing. In another example, the computing system may receive a signal that indicates when the elongate structure is increasing or decreasing in height. For instance, the computing system may receive a signal indicating a change in the height of the elongate structure in response to the tether system receiving input from a human operator at an interface to adjust the height of the elongate structure.

In further examples, the computing system of a tether system may further detect the particular amount that the elongate structure increased or decreased in height and cause the tether system to reconfigure the tether based on the particular change in height. For example, the computing system may cause a spooling mechanism to unspool a certain amount of tether depending on the measured amount that the elongate structure increased in height.

II. Example Architecture

A. Computing Device

FIG. 1 is a simplified block-diagram of an example computing device 100 that can perform various acts and/or functions, such as those described in this disclosure. Computing device 100 can include various components, such as processor 102, data storage unit 104, communication interface 106, and/or user interface 108. The components can be connected to each other (or to another device, system, or other entity) via connection mechanism 110.

In this disclosure, the term "connection mechanism" means a mechanism that facilitates communication between two or more devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

Computing device 100 can take various forms, such as a workstation terminal, a desktop computer, a laptop, a tablet, and/or a mobile phone.

B. Tether System

Figure 2:
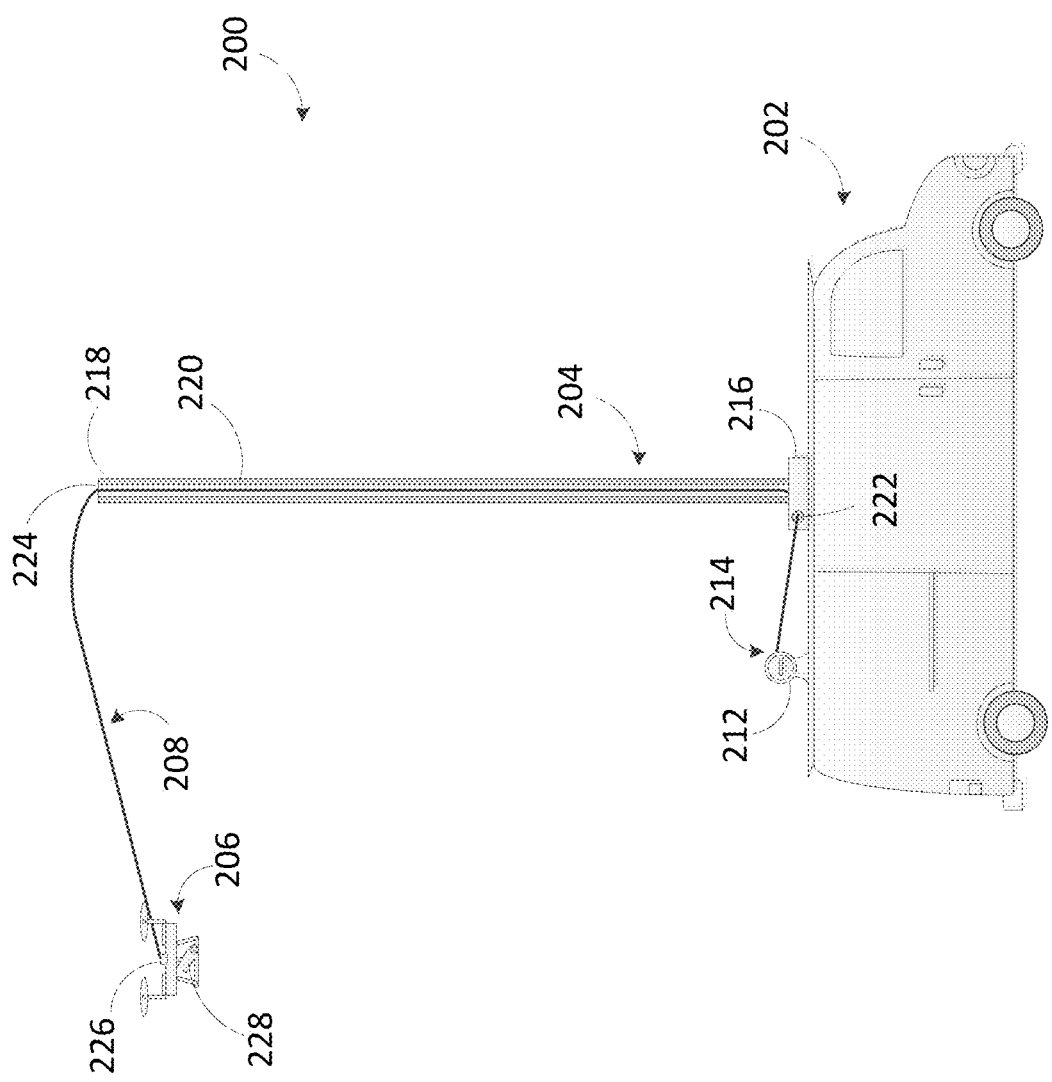
FIG. 2 is an illustration of an example UAV system.

FIG. 2 is an illustration of an example tether system 200. System 200 includes base 202, elongate structure 204, UAV 206, and tether 208, but can also include more or less components within examples. For instance, system 200 can include components not shown in FIG. 2, such as a computing system. In this disclosure, the term "computing system" means a system that includes at least one computing device. As such, system 200 can be configured to perform various acts and/or functions, including those described in this disclosure (including in the accompanying drawings) in accordance with a set of instructions specified by such a computing system.

Base 202 is shown as a vehicle in FIG. 2, but can exist in other non-stationary or stationary configurations in some examples. For instance, base 202 can be another type of mechanical structure in other examples. As shown, base 202 includes spooling mechanism 212 configured with first coupling-point 214.

Spooling mechanism 212 is a mechanical structure coupled to base 202 that can store and adjust a length of a certain portion of a tether 208 through automatic or manual means. For example, spooling mechanism 212 may include a reel that rotates to either wind tether 208 around the reel, and thereby decrease the length of the portion of tether 208 that is not wound around the reel, or unwind tether 208, and thereby increase the length of the portion of tether 208 that is not wound around the reel. Although spooling mechanism 212 is shown coupled to base 202, spooling mechanism 212 can have other positions within examples. For example, spooling mechanism 212 may couple to an exterior of elongate structure 204 or inside elongate structure 204.

As shown in FIG. 2, first coupling-point 214 is disposed on the base, but it could be disposed elsewhere, such as on elongate structure 204. Within various arrangements, spooling mechanism 212 can be configured to automatically adjust the length of tether 208 via mechanical operation based on user input or can also enable a human operator to manually adjust tether 208 (e.g., by winding/unwinding spooling mechanism 212 via rotation of a handle or by causing an electric motor to operate so as to engage spooling mechanism 212 and effect such winding/unwinding). In some instances, spooling mechanism 212 can also serve as storage for tether 208 during navigation by base 202.

In some examples, base 202 can have other components, such as a power source and communication components. For instance, UAV 206 can communicate and receive power from components positioned on base 202 through tether 208. In further examples, base 202 may include an interface that enables control input for elongate structure 204 or UAV 206 from a human operator. For instance, the interface may receive input that specifies for system 200 to increase or decrease the height of elongate structure 204. The interface may also enable the human operator to adjust other aspects of elongate structure 204, such as the orientation or position.

As shown in FIG. 2, elongate structure 204 can be a vertically-oriented structure coupled to base 202. In FIG. 2, elongate structure 204 is shown in a cutaway form that illustrates the interior of elongate structure 204. Elongate structure 204 can take various forms. For example, elongate structure 204 can be a mast.

In addition, elongate structure can be configured such that is has an adjustable height. For example, elongate structure 204 can be configured with telescoping portions that allow the height of elongate structure 204 to be increased or decreased as desired, perhaps using pneumatics or other mechanics. Elongate structure 204 can also change orientation and position, and collapse into a storable position, perhaps using pneumatics or other mechanics.

In some instances, elongate structure 204 may automatically increase or decrease in height depending on a desired navigation height of UAV 206. For example, a computing system of system 200 may receive sensor data from a sensor positioned on UAV 206 that specifies the current or a subsequent altitude of UAV 206. With this arrangement, the computing system may automatically adjust the height of elongate structure 204 based on the sensor data from UAV 206 to accommodate flight operations of UAV 206. In another example, system 200 may enable a human operator to adjust the height of elongate structure 204 via an interface, such as a touchscreen or control panel.

As shown in FIG. 2, elongate structure 204 connects to base 202 at lower end 216 and extends in a vertical orientation from base 202 with upper end 218 of elongate structure 204 positioned opposite of lower end 216. Additionally, elongate structure 204 can include inner channel 220 with lower access-point 222 to inner channel 220 disposed proximate lower end 216, and upper access-point 224 of inner channel 220 disposed proximate upper end 218. Upper-access point 224 is shown having a circular opening to enable full rotation of tether 208 as UAV 206 navigates an environment in various directions, but can have other configurations in some examples.

As shown in FIG. 2, in some examples, tether 208 may be routed through inner channel 220 of elongate structure 204. Thus, tether 208 may enter lower access-point 222, pass through inner channel 220 and exit through upper access-point 224. As such, spooling mechanism 212 may be situated exterior to elongate structure 204 (e.g., mounted to base 202 proximate lower end 216 of the elongate structure 204, as shown in FIG. 2). However, in some examples, spooling mechanism 212 may be mounted at other locations, such as within base 202 or elongate structure 204 or situated along an exterior of elongate structure 204. For instance, spooling mechanism 212 may couple to elongate structure 204 such that first coupling-point 214 is positioned proximate upper end 218 of elongate structure 204. In this configuration, tether 208 may extend from first-coupling point 214 to second coupling-point 226 without extending through a portion of inner channel 220 of elongate structure 204.

In some instances, lower access-point 222 may not provide access to inner channel 220 from an exterior of base 202. For instance, if spooling mechanism 212 is mounted within base 202, below lower end 216 of elongate structure 204, an access point to inner channel 220 may be provided that is interior to base 202 to thereby provide a path for the tether to pass between the such an interior-mounted spooling mechanism and inner channel 220 of elongate structure 204.

Moreover, in some cases, spooling mechanism 212 may be disposed within elongate structure 204 itself, in which case inner channel 220 may only extend between upper access-point 224 and the location of such a spooling mechanism. In any of these configurations, operation of spooling mechanism 212 to wind/unwind tether 208 can be used to control the length of tether 208 that extends from proximate upper end 218 of elongate structure 204 (e.g., at upper access-point 224) to UAV 206, and thereby limit the maximum separation distance between upper end 218 of elongate structure 204 and UAV 206.

System 200 further includes UAV 206 tethered to base 202 via tether 208. UAV 206 can be any type of aircraft capable of operation without an on-board human operator. For instance, in some examples, a human operator can control navigation of UAV 206 via a physically separate remote control that can provide control instructions to UAV 206 via a wired or wireless connection. As shown in FIG. 2, UAV 206 can be configured with second coupling-point 226 that serves as the connection point for connecting tether 208 to UAV 206. Within examples, second coupling-point 226 can have various locations on UAV 206, which can depend on the configuration of UAV 206. As such, UAV 206 can have various configurations, such as a helicopter, quadcopter, fixed-wing aircraft, blimp, or glider, and can operate in various modes, such as a remote-control mode, an autonomous mode, or a semi-autonomous mode.

UAV 206 can include camera 228 configured to capture video and/or images from an aerial perspective. UAV 206 can include other components, such as a power source (e.g., battery), various types of sensors, and a computing system located on-board. In some examples, UAV 206 can also be configured to receive power from a power source located on base 202 through a power-distribution connection positioned within tether 208. This can enable UAV 206 to have a reduced weight since an on-board battery is not required. During operation, UAV 206 can transmit and receive communications, such as sensor data, images, video, and control instructions, using tether 208 or through a wireless connection with another computing system, such as the computing system of base 202.

System 200 includes tether 208 that serves as a connecting link between base 202 and UAV 206. Tether 208 can include various materials, including materials that enable elastic extension as well as materials that enable transfer of electrical power or communications between the computing systems of base 202 and UAV 206. In some examples, tether 208 can include multiple components constructed together.

III. Example Operations

System 200 and/or components thereof can perform various acts. These acts and related features will now be described. A computing system of system 200 can measure operations of components of system 200. For example, the computing system may detect a change in the height of elongate structure 204 and cause tether 208 to be reconfigured within system 200 based on the detected change in height of elongate structure 204. The computing system may detect a change in the current height of elongate structure 204 using sensor data from a sensor system of system 200 (which may be coupled to or integrated with the computing system of system 200, for example) or via other techniques. For instance, sensors, such as measurement or displacement sensors positioned on elongate structure 204 or another component of system 200 may provide sensor data to the computing system that indicates the change in height of elongate structure 204.

In some examples, the computing system may detect an increase in the height of elongate structure 204 and cause spooling mechanism 212 to unspool a portion of tether 208. For instance, the computing system may detect elongate structure 204 increasing in height using sensor data from a sensor system associated with the tether system. In some instances, the computing system may measure the amount that elongate structure 204 increased in height and cause the reconfiguration of tether 208 based on the measured amount that elongate structure 204 increased in height.

In other examples, the computing system may detect a decrease in the height of elongate structure 204 and cause spooling mechanism 212 to spool a portion of tether 208. For example, the computing system may use sensor data from a sensor system of the tether system to detect elongate structure 204 decreasing in height. In some instances, the computing system may measure the amount that elongate structure 204 decreased in height and cause the reconfiguration of tether 208 based on the measured amount that elongate structure 204 decreased in height.

Figure 3:
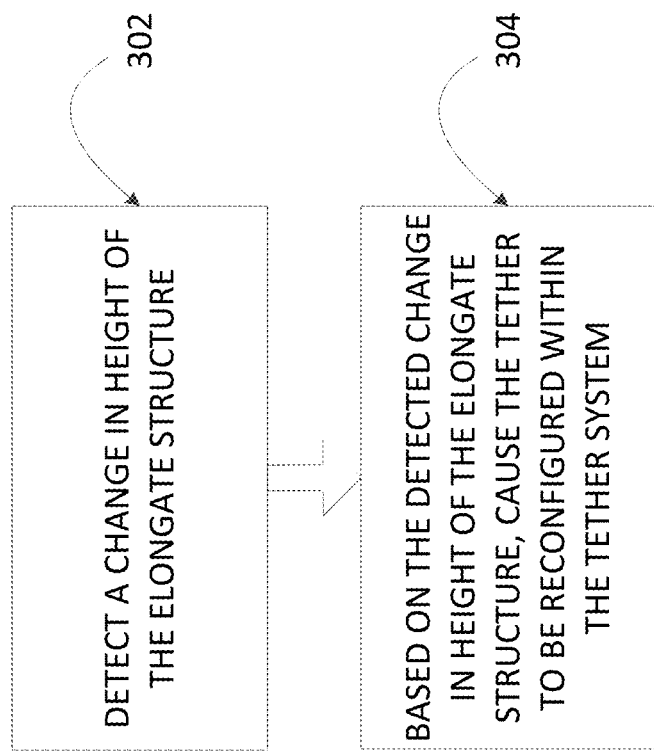
FIG. 3 is a flow chart of an example method.

FIG. 3 is a flow chart illustrating an example method 300. At block 302, method 300 can include detecting a change in height of the elongate structure. At block 304, method 300 can include based on the detected change in height of the elongate structure, causing the tether to be reconfigured within the tether system.

IV. Example Variations

Although some of the acts and/or functions described in this disclosure have been described as being performed by a particular entity, such acts and/or functions can be performed by any entity, such as those described in this disclosure. Further, although the described acts and/or functions have been recited in a particular order, the acts and/or functions need not be performed in the order recited. However, in some instances, it can be desired to perform the acts and/or functions in the order recited. Also, not all of the described acts and/or functions need to be performed to achieve one or more of the benefits provided by this disclosure, and therefore not all acts and/or functions are required.

Although certain variations have been discussed in connection with one or more example of this disclosure, such variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

I claim:

1. A tether system for use with an unmanned aerial vehicle (UAV), the tether system comprising:
   a base;
   a vertically-oriented elongate structure having an adjustable height, wherein the elongate structure comprises a lower end, and an upper end, wherein the base is coupled to the elongate structure proximate the lower end;
   a first coupling-point positioned proximate the upper end of the elongate structure;
   a tether that extends from the first coupling-point to a second coupling-point of the UAV; and
   a computing system configured for performing a set of acts comprising:
      detecting a change in height of the elongate structure; and
      responsive to the detected change in height of the elongate structure, causing the tether to be reconfigured a particular amount within the tether system that is proportionate to the change in the height of the elongate structure.

2. The tether system of claim 1, wherein the base is a vehicle.

3. The tether system of claim 1, wherein the base comprises a spooling mechanism, and wherein causing the tether to be reconfigured the particular amount within the tether system comprises causing the spooling mechanism to spool or unspool a portion of the tether.

4. The tether system of claim 3, wherein detecting the change in height of the elongate structure comprises detecting an increase in the height of the elongate structure, and wherein causing the tether to be reconfigured the particular amount within the tether system comprises causing the spooling mechanism to unspool a portion of the tether.

5. The tether system of claim 3, wherein detecting the change in height of the elongate structure comprises detecting a decrease in the height of the elongate structure, and wherein causing the tether to be reconfigured the particular amount within the tether system comprises causing the spooling mechanism to spool a portion of the tether.

6. The tether system of claim 1, further comprising:
   a sensor system; and
   wherein detecting the change in height of the elongate structure comprises using sensor data obtained from the sensor system to detect the change in height of the elongate structure.

7. The tether system of claim 1, wherein the set of acts further comprises:
   outputting a signal that indicates reconfiguration of the tether is complete.

8. A non-transitory computer-readable medium for use with a tether system comprising:

a base;

a vertically-oriented elongate structure having an adjustable height, wherein the elongate structure comprises a lower end, and an upper end, wherein the base is coupled to the elongate structure proximate the lower end;

a first coupling-point positioned proximate the upper end of the elongate structure;

a tether that extends from the first coupling-point to a second coupling-point of an unmanned aerial vehicle (UAV); and wherein the non-transitory computer-readable medium has stored thereon program instructions that when executed cause performance of a set of acts comprising:

detecting a change in height of the elongate structure; and responsive to the detected change in height of the elongate structure, causing the tether to be reconfigured a particular amount within the tether system that is proportionate to the change in the height of the elongate structure.

9. The non-transitory computer-readable medium of claim 8, wherein the base of the tether system is a vehicle.

10. The non-transitory computer-readable medium of claim 8, wherein the base of the tether system comprises a spooling mechanism, and wherein causing the tether to be reconfigured the particular amount within the tether system comprises causing the spooling mechanism to spool or unspool a portion of the tether.

11. The non-transitory computer-readable medium of claim 10, wherein detecting the change in height of the elongate structure comprises detecting an increase in the height of the elongate structure, and wherein causing the tether to be reconfigured the particular amount within the tether system comprises causing the spooling mechanism to unspool a portion of the tether.

12. The non-transitory computer-readable medium of claim 10, wherein detecting the change in height of the elongate structure comprises detecting a decrease in the height of the elongate structure, and wherein causing the tether to be reconfigured the particular amount within the tether system comprises causing the spooling mechanism to spool a portion of the tether.

13. The non-transitory computer-readable medium of claim 8, wherein the tether system further comprises:

a sensor system; and wherein detecting the change in height of the elongate structure comprises using sensor data obtained from the sensor system to detect the change in height of the elongate structure.

14. The non-transitory computer-readable medium of claim 8, wherein the set of acts further comprises:

outputting a signal that indicates reconfiguration of the tether is complete.

15. A method for use with for use with a tether system comprising:

a base; a vertically-oriented elongate structure having an adjustable height, wherein the elongate structure comprises a lower end, and an upper end, wherein the base is coupled to the elongate structure proximate the lower end; a first coupling-point positioned proximate the upper end of the elongate structure; and a tether that extends from the first coupling-point to a second coupling-point of an unmanned aerial vehicle (UAV), the method comprising:

detecting, by a computing system, a change in height of the elongate structure; and responsive to the detected change in height of the elongate structure, causing, by the computing system, the tether to be reconfigured a particular amount within the tether system that is proportionate to the change in height of the elongate structure.

16. The method of claim 15, wherein the base of the tether system comprises a spooling mechanism, and wherein causing the tether to be reconfigured within the tether system comprises causing the spooling mechanism to spool or unspool a portion of the tether.

17. The method of claim 16, wherein detecting the change in height of the elongate structure comprises detecting an increase in the height of the elongate structure, and wherein causing the tether to be reconfigured the particular amount within the tether system comprises causing the spooling mechanism to unspool a portion of the tether.

18. The method of claim 16, wherein detecting the change in height of the elongate structure comprises detecting a decrease in the height of the elongate structure, and wherein causing the tether to be reconfigured the particular amount within the tether system comprises causing the spooling mechanism to spool a portion of the tether.

19. The method of claim 15, wherein the tether system further comprises:

a sensor system; and wherein detecting the change in height of the elongate structure comprises using sensor data obtained from the sensor system to detect the change in height of the elongate structure.

20. The method of claim 15, further comprising:

outputting, by the computing system, a signal that indicates reconfiguration of the tether is complete.

* * * * *